US009411575B2

(12) United States Patent
Walters (10) Patent No.: US 9,411,575 B2
(45) Date of Patent: Aug. 9, 2016

(54) SYSTEMS AND METHODS FOR QUALITY ASSURANCE AUTOMATION (71) Applicant: eBay Enterprise, Inc., King of Prussia, PA (US)

(72) Inventor: Jay Walters, Wallingford, PA (US)

(73) Assignee: eBay Enterprise, Inc., King of Prussia, PA (US)

( * ) Notice: Subject to any disclaimer, the term of this patent is extended or adjusted under 35 U.S.C. 154(b) by 35 days.

(21) Appl. No.: 13/721,754

(22) Filed: Dec. 20, 2012

(65) Prior Publication Data

US 2013/0339933 A1    Dec. 19, 2013

Related U.S. Application Data (60) Provisional application No. 61/659,345, filed on Jun. 13, 2012.

(51) Int. Cl.
*G06F 9/44*    (2006.01)
*G06F 11/36*    (2006.01)

(52) U.S. Cl.
CPC .............. *G06F 8/70* (2013.01); *G06F 11/3688* (2013.01); *G06F 11/3692* (2013.01)

(58) Field of Classification Search
CPC ............ G06F 11/3664; G06F 11/3672; G06F 11/3688; G06F 11/3692
USPC ......................................................... 717/131
See application file for complete search history.

(56) References Cited

U.S. PATENT DOCUMENTS

| 7,293,202 | B2 * | 11/2007 | Kamani ............. G06F 11/3688 714/25 |
| 8,332,632 | B2 * | 12/2012 | Iftode et al. ................... 713/156 |
| 8,387,024 | B2 * | 2/2013 | Urra et al. ..................... 717/131 |
| 8,561,036 | B1 * | 10/2013 | Beans et al. ................... 717/140 |
| 2003/0065985 | A1 * | 4/2003 | McGeorge, Jr. ................ 714/46 |
| 2004/0128651 | A1 * | 7/2004 | Lau ..................... G06F 11/3664 717/124 |
| 2006/0174170 | A1 * | 8/2006 | Garland et al. ................. 714/57 |
| 2008/0016492 | A1 * | 1/2008 | Kristoffersen et al. ....... 717/104 |
| 2009/0031170 | A1 * | 1/2009 | Tsurumi et al. ................. 714/38 |
| 2010/0145718 | A1 * | 6/2010 | Elmore et al. ................. 705/1.1 |
| 2012/0054101 | A1 * | 3/2012 | Duggal et al. .................. 705/44 |
| 2013/0055213 | A1 * | 2/2013 | Weigert ........................ 717/126 |
| 2013/0110640 | A1 * | 5/2013 | Powell et al. .............. 705/14.66 |

OTHER PUBLICATIONS

Benatallah et al., "The Self-Serv Environmnet for Web Services Composition," IEEE, 2003, 9pg.*
Zhu et al., "Collaborative Testing of Web Services," IEEECS, 2010, 15pg.*

* cited by examiner

*Primary Examiner* — Ryan Coyer
(74) *Attorney, Agent, or Firm* — Schwegman, Lundberg & Woessner, P.A.

(57) ABSTRACT

A method and a system for quality assurance automation are described. A system comprises a requirements service to generate requirements artifacts from one or more sources. The requirement artifacts are of a standardized format that is referenced in tested software code. A data provider service standardizes and distributes various types of common test data across multiple business disciplines. An execution service manages test executions across and multiple environments where test software code is installed. An evaluation service analyzes data resulting from the test executions. A reporting service reports the analyzed data.

20 Claims, 8 Drawing Sheets

SYSTEMS AND METHODS FOR QUALITY ASSURANCE AUTOMATION

This application claims the priority benefit of U.S. Provisional Application No. 61/659,345, filed Jun. 13, 2012, which is incorporated herein by reference.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

TECHNICAL FIELD

The present application relates generally to the technical field of network communications and, in one specific example, to quality assurance automation.

BACKGROUND

The systems that run websites on the World Wide Web typically use databases, services, and other computing systems that tend be very complex. Typically these systems are tested manually by people and automatically by software that repeatedly performs various actions in an attempt to ensure that things are working correctly. Most testing involves clicking hyperlinks or filling information into forms and submitting to the systems for processing. When this type of activity is performed by software it is commonly referred to as the practice of Quality Assurance Automation (QA Automation).

In e-commerce, websites perform the same functions repeatedly. A user views a product on the website and decided to buy it. The website then receives the user's customer information such as name, address, a tender for payment (e.g., MasterCard, PayPal, or Bill Me Later), a discount code, and an email address where the website can send the order and marketing messages. In total, a website may perform ten tasks. The test would document each of the ten tasks and report the results of the test to the programmer or another person. The test may record the performance of each task each day to compare daily performances over a period of a week or six months or more. Monitoring the performance of each of the ten tasks is important because software changes every day because coders go in and make changes, build new features, or fix bugs. When the coder makes a code change, he may inadvertently break something. It may take days, weeks, maybe even months in the production until someone discovers that a particular code change create a new bug.

BRIEF DESCRIPTION OF THE DRAWINGS

Some embodiments are illustrated by way of example and not limitation in the figures of the accompanying drawings in which.

DETAILED DESCRIPTION

Example methods an systems for quality assurance automation are described. In the following description, for purposes of explanation, numerous specific details are set forth in order to provide a thorough understanding of example embodiments. It will be evident, however, to one skilled in the art that the present invention may be practiced without these specific details.

The systems and methods described herein perform Quality Assurance Automation tests as well as detect and document code changes to show if the software is getting better or is periodically getting worse before it gets better. The testing informs software developers, analysts and business managers if changes made to the software and/or system will cause an unintended consequence in another part of the application or system, or may affect the performance of another task that is performed by the software. Typically a piece of code may affect a number of tasks but programmers may mistakenly only consider the effects of the change to one of those tasks, potentially causing issues in the performance of the remaining tasks.

If these unintended consequences remain undetected, the issues stemming from the change may be discovered over a period of time. By detecting the changes and testing the effects of the changes, these unintended consequences may be avoided. Before the changed code is committed (i.e., implemented within the software) the changed code is tested. By requiring that changes to the code are tested before implementing the changes, the coders can avoid creating new errors or bugs. The changes may be recorded to provide proof that the portions of the code that worked yesterday also works today. If the code doesn't work the same as it did the day prior, the testing provides visibility not only to the developer but to the management.

By allowing tests to be performed rapidly, the tests may also be performed more frequently. Having more frequent tests that use maintained and validated test data allows the health of the software to be evaluated and presented visually to users closer to real time. The visualizations of software quality may be electronically provided to one or more subscribers over a period of time to allow the subscriber to compare current performance with past performance.

When a website is tested, developers may use garbage information that is made up using fake names and fake addresses. In one embodiment, sets of information that correspond to real accounts may be used to test the website (e.g., a data provider service). The real accounts may include credit cards, customer names, and addresses for multiple languages and multiple countries. The information corresponding to the real accounts is provided to third parties for use in a testing environment. For example, the real test data may include the addresses of public buildings, for example, state capitols, provincial capital buildings, and legislative buildings in Japan and the UK. All the customer information in the test data includes registered email addresses that are accessible to testers in order to validate that when a customer places an order, the customer receives a confirmation email. When an order is shipped, the shipping email is received.

For example, an operator of a website may have shipping restrictions, such as not shipping to Alaska and Hawaii. The operator might occasionally test the website using fake data. But if a code change unintentionally causes a change, the change might not be detected until the next test. Using the systems and method described herein to test the website using real data on a regular basis, the change is detected sooner.

The tests performed include positive and negative test cases. A positive test case is a scenario that is expected to work and be completed satisfactorily. A negative test case is a scenario that the software should reject. For example, if a website doesn't ship to China, the negative test case involves requesting that an item be shipped to China with the expectation that the website will fail to ship to China. For example, if a website says that a particular task can only be performed on HTTPS (secure), the test may attempt to perform the task on HTTP (insecure) to confirm that the information isn't accepted.

While doing the continuous positive and negative testing, a coder may change the code or a configuration on an environment. The coder is able to use this tool and immediately test the change. Tests that might take 8 hours to do manually might be performed in 5 to 15 minutes while performing a more rigorous test.

Each software feature may require different tests to perform each of the tasks correctly. For example, different e-commerce merchants sell different things and so each merchant may need to test for different issues. Using configuration to provision various implementations, the tests performed at each website are defined by small pieces of configuration instead of typically larger amounts of code. For example, a merchant may not ship to Alaska or Hawaii but another partner may. That difference is managed using the merchant configuration/provisioning process. More specifically, a configuration file will indicate whether a particular merchant ships to Alaska or Hawaii. The code will then test that the website conforms to the shipping policy. The automation framework natively covers a wide range of testing types. For example, smoke testing includes non-exhaustive software testing, ascertaining that the most crucial functions of a program work, without testing with finer details. Functional testing includes testing that operations perform as expected. Positive or negative testing (i.e., exception testing) forces success and error conditions in the system. Integration testing groups individual software modules into a larger, system-wide aggregate to test for the correct connectivity between systems. Regression testing determines that the behavior of the system has not changed. User interface testing is used for front end, aesthetic-focused testing. Stress testing is used to determine the absolute capacities of the application and operational infrastructure. Performance testing provides assurance that the performance of the system will be adequate for both batch runs and online transactions in relation to business projections and requirements. Load testing is used to determine the points at which the capacity and performance of the system become degraded to the situation that hardware or software upgrades would be required. End-to-end testing exercises all systems and sub-systems to evaluate correct functionality across all integration points across the software architecture. Accessibility tests are front end-specific tests that determine whether or not people with disabilities can use a provided user interface.

The automation framework also provides tools and integrations that support software build and release processes. For example, while development and production support teams are writing, developing and fixing software in the development phase they can use the automation tools to ensure the software they are building is working correctly and meeting the appropriate requirements. Once coding is complete, installation of the software is requested and the results of automation report are provided for review by the decision makers responsible for accepting and performing the installation during the quality assurance phase. Automation reports can easily be compared with previous records to aid in decisions to accept or reject the installation requests. As part of release management, when installation requests are approved, performed and completed, the same automation tools and tests are repeated against the environment where the new installation has occurred. Results are compared with those from the development cycle and evaluations of the installation's readiness are made. For developers, quality assurance and release managers, when problems are detected and additional changes are made (for example, configuration problems) the automation tools and tests are repeated until satisfactory results are achieved and the software is accepted for formal testing. For release managers, production support and operations personnel, as the process continues through the lifecycle and various environments, each installation is re-evaluated using the same automation tools and tests.

Figure 1:
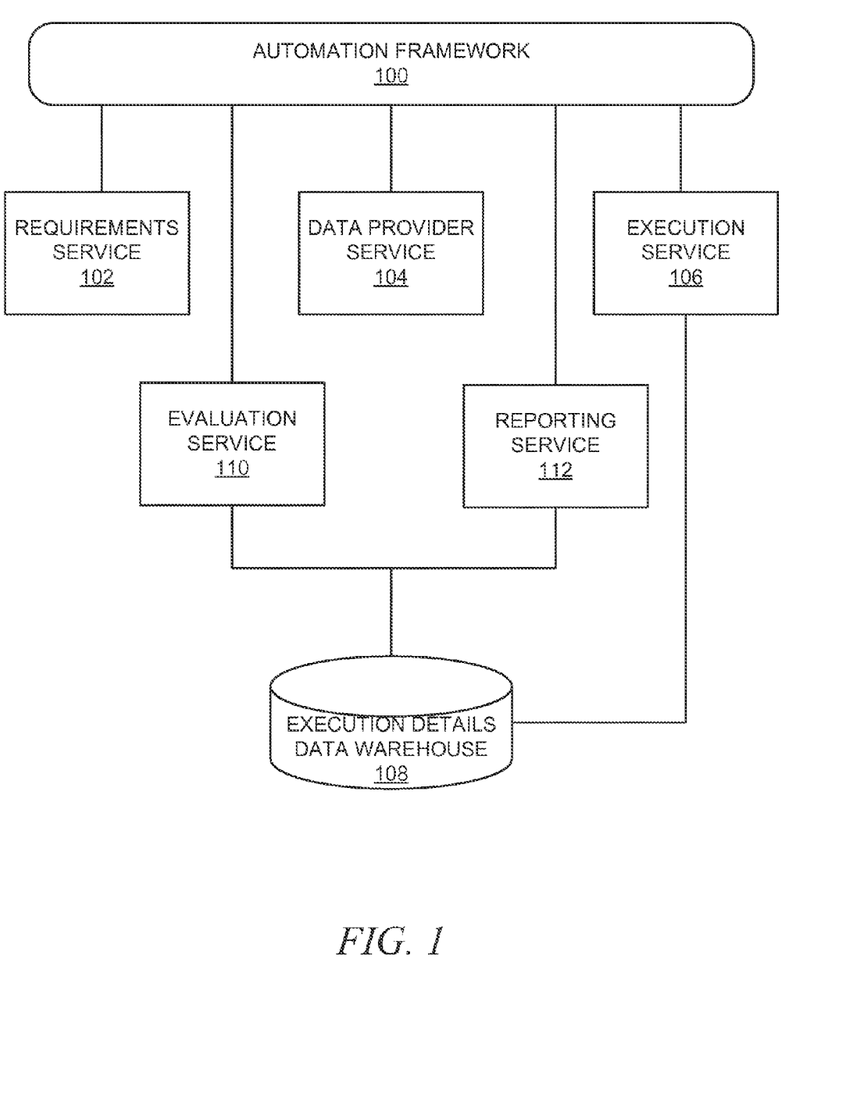
FIG. 1 is a network diagram depicting an automation framework, within which one example embodiment may be deployed.

FIG. 1 is a network diagram depicting an automation framework 100, within which one example embodiment may be deployed. The automation framework 100 provides quality assurance testing automation to one or more merchant websites. Each merchant website may provide perform one or more tasks. In some instances, the merchant websites are e-commerce websites. The automation framework 100 provides a comprehensive programming and configuration model for performing automated quality assurance tests across all aspects of enterprise applications. It is designed to provide quality assurance automation testing, controls, data creation and maintenance, data recording, data analysis and data reporting across all aspects of hardware and software architectures.

A requirements service 102 receives and manages requirements for the tested code. Software engineers from product development and quality assurance automation disciplines implement small, standardized and generic references into the software they are creating. Using the tools provided by the requirements service 102, the software engineers may evaluate development efforts against the requirements documentation and generate requirement coverage reports.

Technical and non-technical users may access content and reports via the requirements service 102 that illustrate requirements covered by the test activities executed against the software and/or system and may produce requirements traceability matrix reports that coordinate the documentation of requirements and their relationships to other requirements through to their actual implementation.

A data provider service 104 provides data used to test the code. Quality assurance engineers can implement small, standardized code references to implement the various test data within the automated testing software they are producing. Using the tools provided by the service they can automatically evaluate their efforts for both positive and negative test cases. Technical and non-technical users have access to the same fully internationalized test data for testing and validation efforts, analysis and reporting purposes. Users are provided with the ability to navigate through the various types of test data available based on desired country and/or language.

An execution service 106 executes tests on the software code using the data provided by the data provider service 104 according to the requirements managed by the requirements service 102. Technical and non-technical users are provided with web based tools to configure tests, schedule test executions and execute tests in an on-demand fashion with real time feedback. The tests are distributed across various machines based on the type of test being performed. All data from these separate machines is collected and aggregated within the execution details data warehouse 108.

Data collected and aggregated within the execution details data warehouse 108 is processed and evaluated to determine current software and/or system health by an evaluation service 110. Historical comparisons and trend analysis evaluations are performed.

A reporting service 112 provides analyzed data stored within the execution details data warehouse 108 via custom levels of reporting that is tailored to various technical and non-technical users.

Figure 2A:
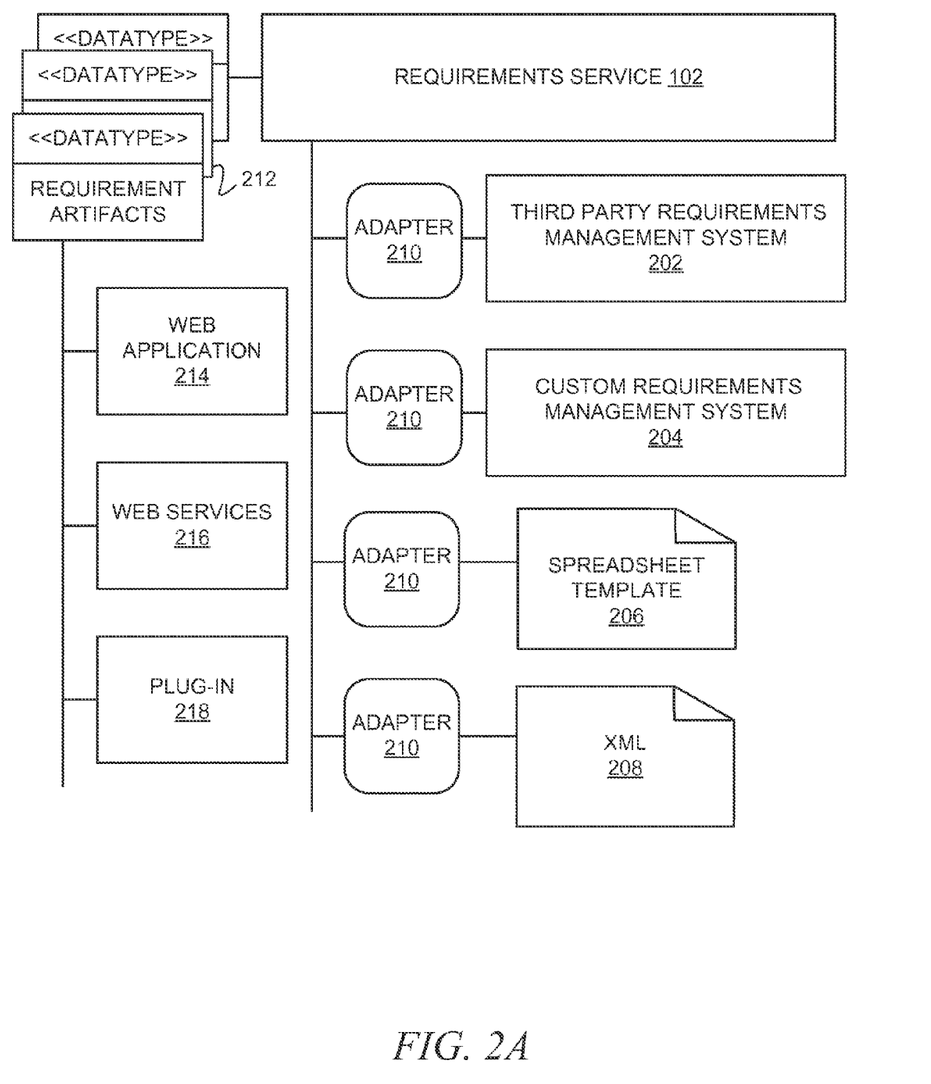
FIG. 2A is a block diagram of a requirements service, according to various embodiments.

FIG. 2A is a block diagram of a requirements service 102, according to various embodiments. The requirements service 102 provides for the standardization and distribution management of software requirement documentation across multiple business disciplines. By providing a centralized operation, the requirements service 102 provides both the adaption of various formats of software requirement content and the use of this information for software development, software and business analysis and quality assurance automation processes.

Figure 2B:
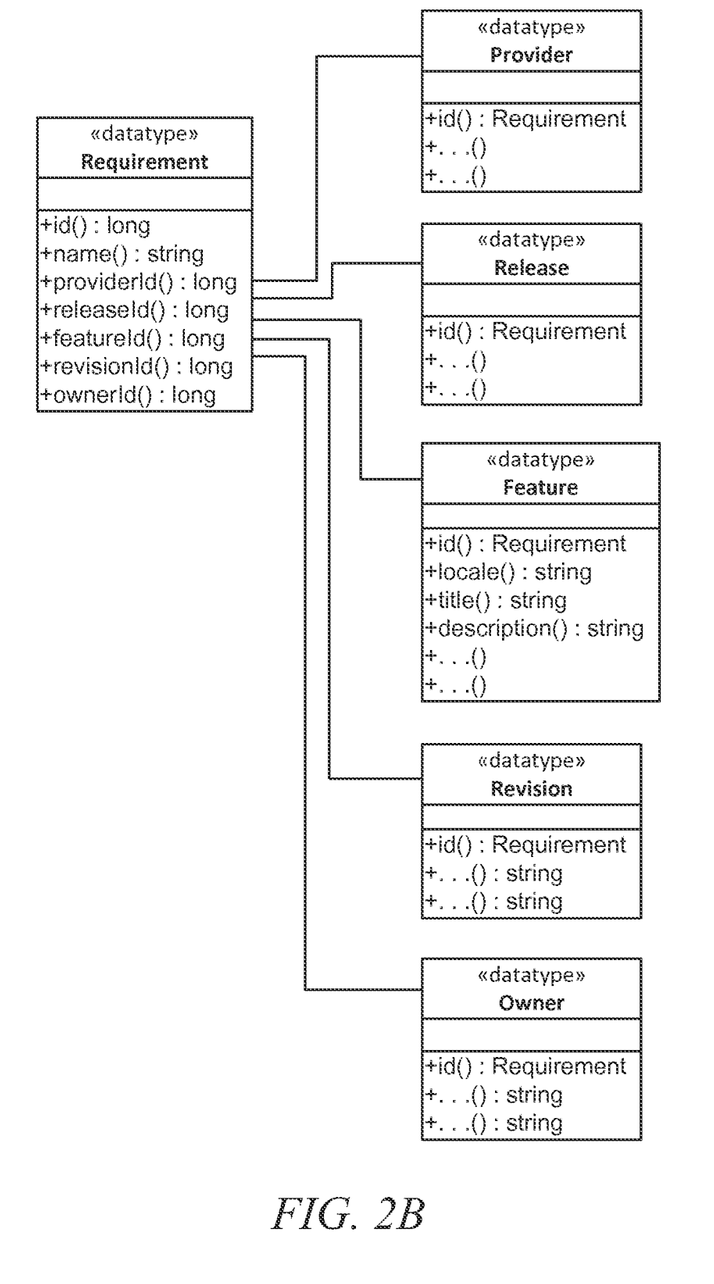
FIG. 2B is a Unified Modeling Language (UML) diagram of an example requirement, according to various embodiments.

The requirements service 102 may receive requirements recorded and managed by a third party requirements management system 202, a custom requirements management system 204, a spreadsheet template 206, or an XML document 208. The requirements service 102 provides various adapters 210 that allow software requirements content to be ingested, transformed into a standardized format and distributed to a variety of consumers within versioned and managed software releases. FIG. 2B is a Unified Modeling Language (UML) diagram of an example requirement, according to various embodiments. As shown, the example requirement may include data identifying a provider, a release, a feature, a revision, and an owner.

Once the requirements service 102 has processed the requirements content and distributed as a versioned software release, the produced requirements artifacts 212 are consumed by a web application 214 or a web service 216. The requirements artifacts 212 may be published within requirements plug-in 218. The web application 214 allows technical and non-technical users to access content and reports that illustrate requirements covered by the test activities executed against the software and/or system. In some instances, requirements traceability matrix coverage reports can be produced to drive plans for manual test coverage as well as future automation test development. The web services 216 may allow technical users to write additional software that accesses report analytics and requirement data via RESTful- and SOAP-based web services. The requirements plugin 218 may allow software engineers from product development and quality assurance automation disciplines implement small, standardized and generic references into the software they are creating. Using the tools provided by the requirements service 102 they can evaluate their development efforts against the requirements documentation and generate requirement coverage reports. To illustrate, the generic references may take the following form if a single requirement is to be met:

```
@Requirement(id="1")
public void method( )  {
    ...
}
```

When multiple requirements are used, the generic reference may be of the form:

```
@Requirement({
    @Requirement(id="1"),
    @Requirement(id="2"),
    @Requirement(id="3")
})
public void method( )  {
    ...
}
```

As time progresses and changes are made to the content maintained within the supported requirements management systems 202 and 204, the spreadsheet template 206 and the XML document 208, the requirements service 102 may produce new versions of the software requirements artifacts 212, which will be provided within a versioned release that contains the ability to compare and report upon the history of all differences (additions, revisions and removals) that have occurred across all previously released versions of the requirements service 102. The requirements artifacts 212 along with the usage of the web application 214, web services 216 and plug-in 208 can provide additional information into the evaluation service 10 and the reporting services 112.

Figure 3:
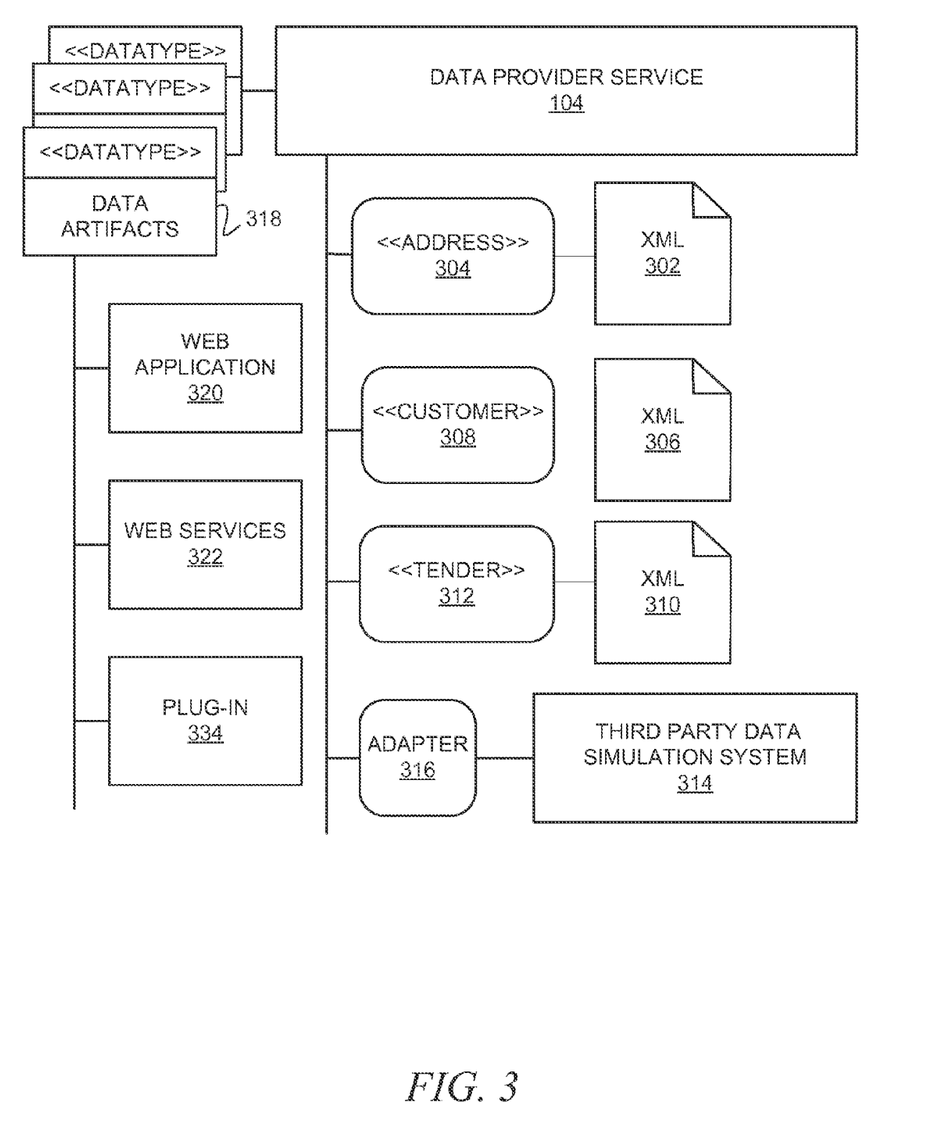
FIG. 3 is a block diagram of a data provider service, according to various embodiments.

FIG. 3 is a block diagram of a data provider service 104, according to various embodiments. The data provider service 104 provides for the standardization and distribution management of various types of common test data across multiple business disciplines. By providing a centralized operation, the data provider service 104 provides consistent, controlled, verified and fully internationalized data for software development, software and business analysis and quality assurance automation processes.

The data provider service 104 may receive data from various sources. Each of the datatypes that represent the test data that is used as an input to this service automatically contains both valid (positive test cases expected to produce successful results) and invalid (negative test cases expected to produce unsuccessful results) data points that are fully internationalized. As depicted, the XML documents 302, 306, and 310 may respectively include on type of data. For example, the XML document 302 may include address data. The address data represents real world addresses within supported countries using the formats and languages supported by that country. The XML document 306 may include customer data. The customer data represents fictitious individuals within supported countries using the formats and languages supported by that country with email addresses that are automatically managed and maintained by the system so that standard communications with these fictitious individuals can test simulated and tested. The XML document 310 may include tender data. The tender data represents fictitious and/or real world information that can be used for the payment of a financial obligation which is securely and automatically managed and reported upon by the service. Tender data is also managed and provided within the context of those supported by individual countries using formats and languages supported by those countries. A third party data simulation system 314 may provide further data. The data provider service 104 provides various adapters 304, 308, 312, and 316 that allow test data content to be ingested, transformed into a standardized format and distributed to a variety of consumers within versioned and managed software releases as data artifacts 318.

The data provider service 104 provides access to internationalized test data for countries and languages supported by the overall framework. This data is provided in standardized formats and is distributed to a variety of consumers within versioned and managed software releases. Once data provider service 104 is distributed as a versioned software release, the produced requirements artifacts 318 (by the requirements service 102) are consumed by both web application 320 and web services 322 (which may or may not be part of web application 214 and web services 216), and are published as a standard code artifact that can be consumed by other software applications.

The web application 320 provides technical and non-technical users with access to the same fully internationalized test data for testing and validation efforts, analysis and reporting purposes. The users are provided with the ability to navigate through the various types of test data available based on desired country and/or language constraints. The web services 322 allow technical users to write additional software that accesses report analytics and test data via RESTful- and SOAP-based web services. Navigation, through the various types of test data may be available based on desired country and/or language constraints provided through a web service interface.

Quality assurance engineers can implement small, standardized code references (e.g., code artifacts) to implement the various test data within the automated testing software being produced. Test data meeting the appropriate constraints (supported countries using the languages supported by that country, randomized/not randomized) using the tools provided by the service they can easily evaluate their efforts for both positive and negative test cases automatically and without any additional programming. The data artifacts 318 along with the usage of the web application 320, web services 322, and code artifacts can provide additional information into the evaluation service 110 and the reporting service 112.

Figure 4:
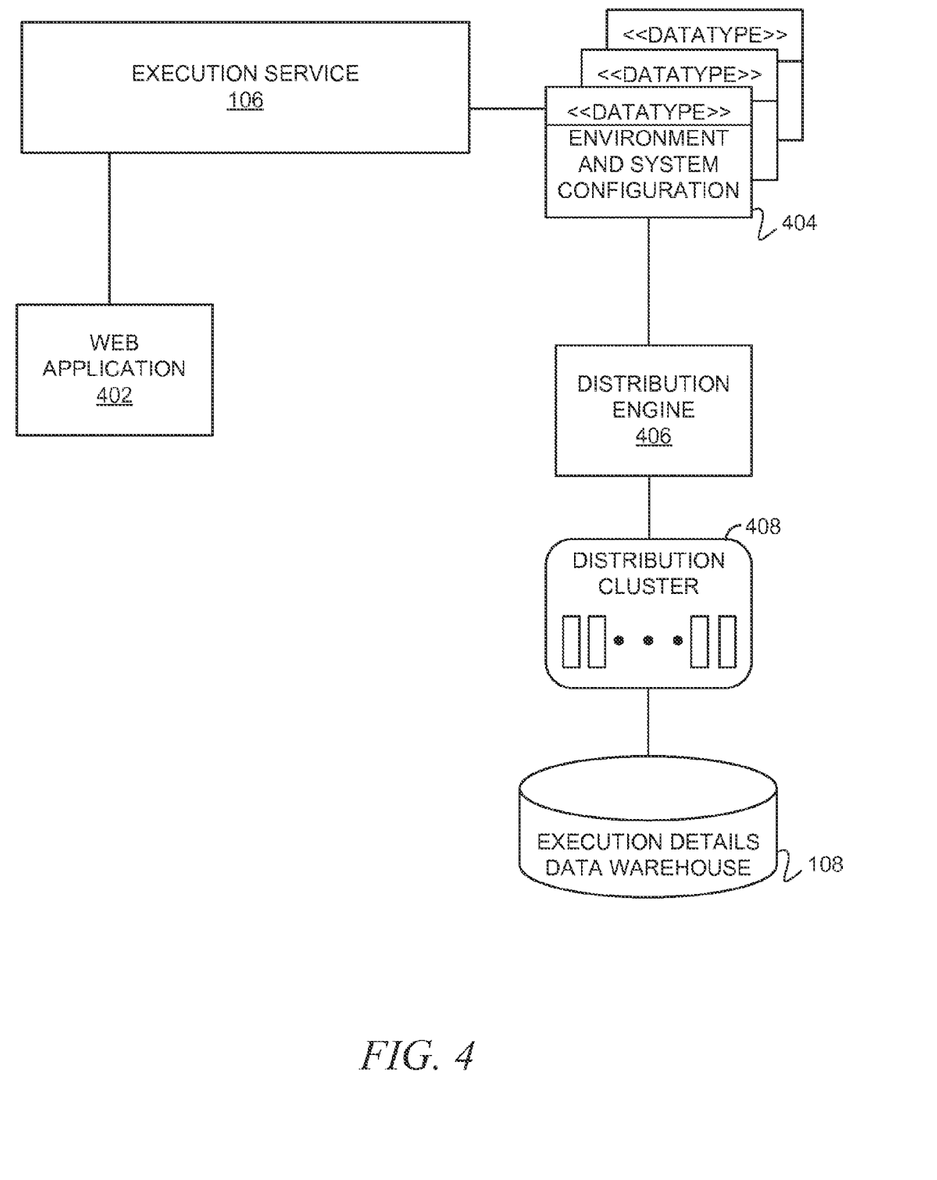
FIG. 4 is a block diagram of an execution service, according to various embodiments.

FIG. 4 is a block diagram of an execution service 106, according to various embodiments. The execution service 106 provides for the management of test executions across and multiple environments where software can be installed. By providing a centralized operation, the execution service 106 provides a consistent, controlled and verified single point of control for members of multiple business disciplines like software development, quality assurance, release management, production support and system operations personnel.

A web application 402 provides technical and non-technical users with web based tools to configure tests, schedule test executions and execute tests in an on-demand fashion with real time feedback. Using the web application, properly permissioned users can configure and/or invoke the execution of the tests that were previously programmed using the provided automation framework 100 and made available within the execution service 106. The tests may contain implementations of the requirements service 102 and/or the data provider service 104 that may be executed against any supported and properly configured environment and system (as depicted by the environment and system configurations 4040) via a distribution engine 406. The distribution engine 406 is responsible for fully managing actual hardware within an execution cluster 408 and distributing appropriate tasks to the appropriate and available resources. As tasks are completed their results are recorded within the execution details data warehouse 108.

The environment and system configuration artifacts 404 along with the usage of the web application 402 and the test execution results recorded within the execution details data warehouse 108 may provide the information used by the evaluation service 110 and the reporting service 112.

Figure 5:
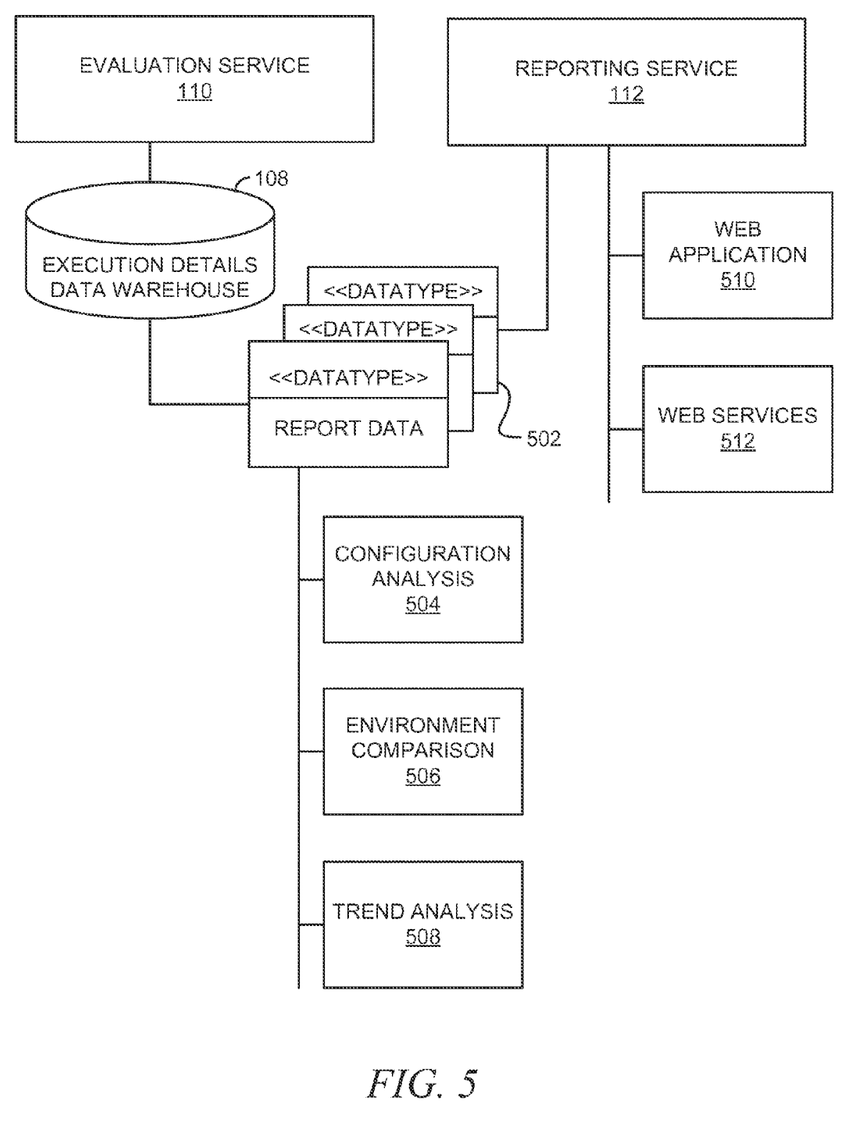
FIG. 5 is a block diagram of an evaluation service and a reporting service, according to various embodiments.

FIG. 5 is a block diagram of an evaluation service 110 and a reporting service 112, according to various embodiments. The evaluation and reporting services 110 and 112 provide for the centralized evaluation and reporting of the data produced by the execution service 106. The evaluation and reporting services 110 and 112 analyze data recorded with execution details data warehouse 108 and performs configuration analysis, environment comparisons, and trend analysis to produce an evaluation of a system or software. Report data 502 processed by the evaluation service 110 is consumed by the reporting service 112 to provide managerial visibility through advanced reporting capabilities on all aspects of automated test execution.

The evaluation service 110 contains the following subsystems that can be used as standalone, real time tools and as part of the overall evaluation service processing of data produced by the execution service 106. In the configuration analysis subsystem 504, configuration details are recorded each time tests are run and changes in these details are detected. When the configuration analysis subsystem 504 is run as a standalone tool, these changes are simply reported upon. When the configuration analysis subsystem 504 is used as part of the overall evaluation reporting services 110 and 112, those details are correlated with the test results to illustrate analyzed potential causes for pass or fail statuses of test executions.

The environment comparison subsystem 506 has the ability to compare software and/or hardware details (e.g., software versions, hardware properties) between multiple, separate instances of software installations. When the environment comparison subsystem 506 is run as a standalone tool, these differences are simply reported upon. When the environment comparison subsystem 506 is used as part of the overall evaluation and reporting services 110 and 112, those details are correlated with the test results to illustrate analyzed potential causes for pass or fail statuses of test executions.

The trend analysis subsystem 508 compares historical data regarding changes that have occurred within various systems and/or the performance of test executions. When the trend analysis subsystem 508 is run as a standalone tool, the particular analysis is simply reported. When trend analysis subsystem 508 is used as part of the overall evaluation and reporting services 110 and 112 those details are correlated with the test results to illustrate the analyzed health of a system and/or software.

The reporting service 112 supports a web application 510 and web services 512. The web application 510 correlates actual recorded test report data to requirements traceability matrix reports that measure and illustrate the adherence to requirements within a project and the health of those implementations within the system and/or software. The web application 510 further reports the analysis performed and provides the insight necessary to implement strong technical controls and governance over the work being performed throughout the software development lifecycle and across the involved organizations. The web application may tailor the analyzed data to various technical and non-technical users. The web services 512 allow technical users to write additional software that accesses report analytics via RESTful- and SOAP-based web services. Navigation through the various types of results, configuration information and specific details is provided through a web service interface.

Figure 6:
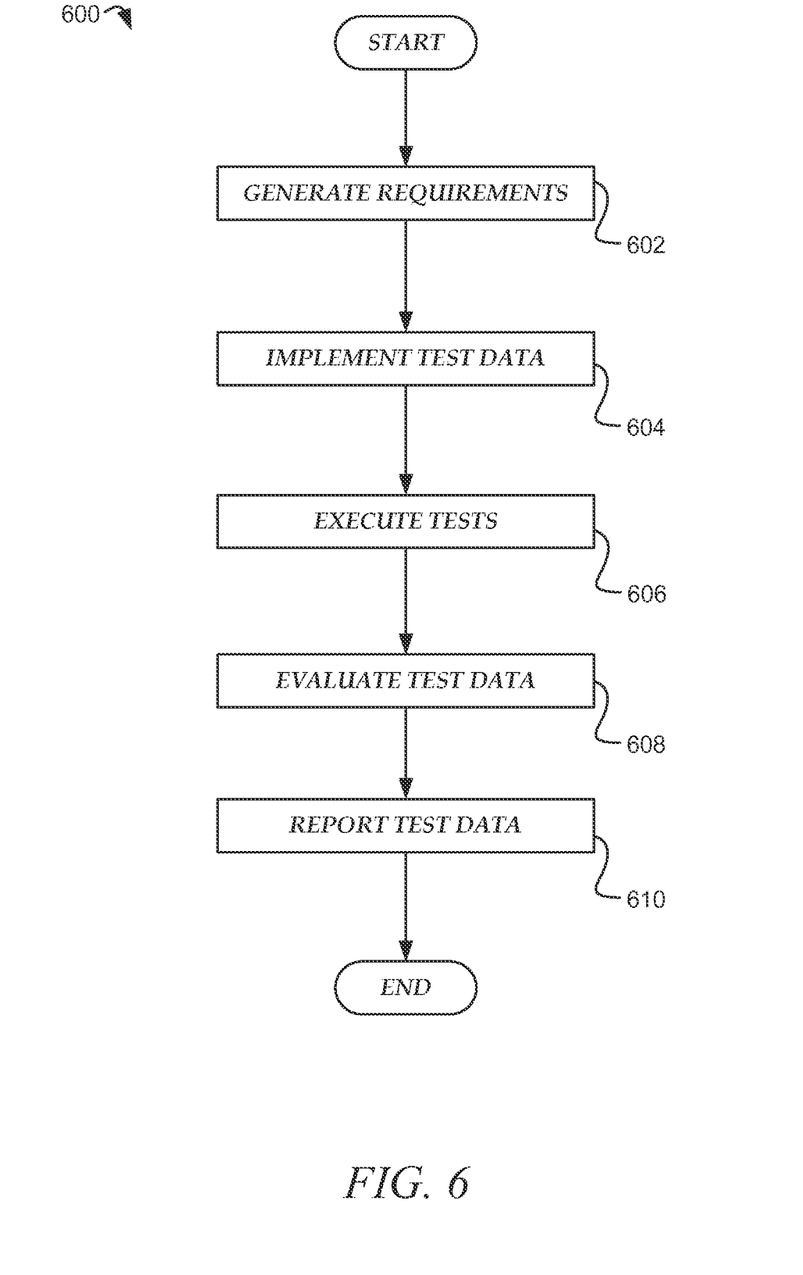
FIG. 6 is a flowchart illustrating an example method, according to various embodiments.

FIG. 6 is a flowchart illustrating an example method 600, according to various embodiments. In an operation 602, requirement artifacts are generated by the requirements service 102. In an operation 604, the test data is implemented using the data provider service 104. In an operation 606, tests are executed by the execution service 106. In an operation 608, the test data is evaluated by the evaluation service 110. In an operation 610, the test data is reported by the report service 112.

The Below is Boilerplate.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at anyone instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processor may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
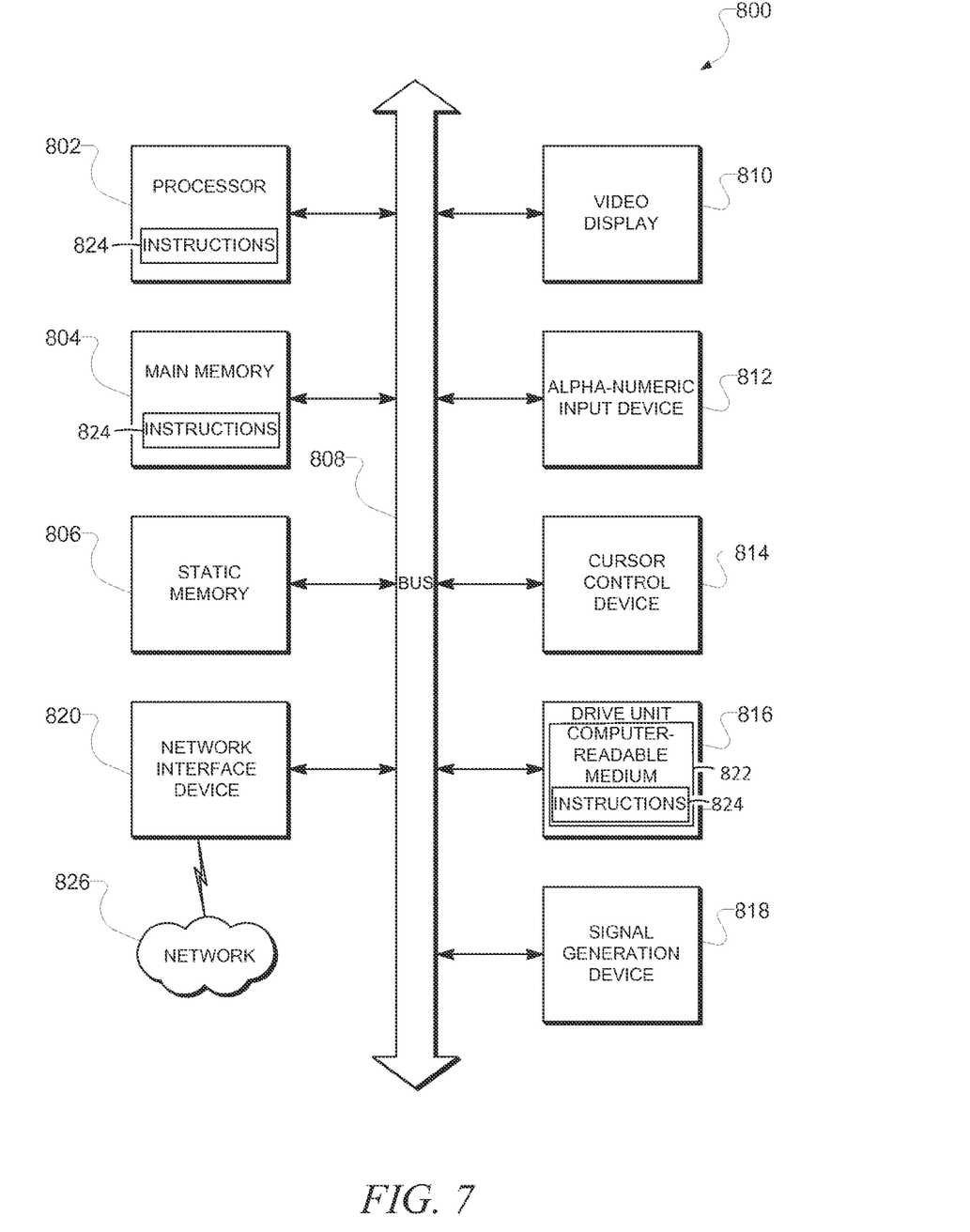
FIG. 7 is a diagrammatic representation of machine in the example form of a computer system within which a set of instructions, for causing the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation device 714 (e.g., a mouse), a disk drive unit 716, a signal generation 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment, to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more processors and executable instructions accessible on a computer-readable medium that, when executed, configure the one or more processors to at least:
generate requirements artifacts from one or more sources, to transform the requirements artifacts into a standardized format, and to establish the transformed requirements artifacts in tested software code, the requirements artifacts including a first version and a second version of a specific requirement artifact;
standardize and distribute various types of common test data across multiple business disciplines as data artifacts;
manage test executions across multiple environments based on using the requirements artifacts established in the tested software code and the provided data artifacts, the multiple environments being where the tested software code is installed;
analyze data resulting from the test executions that use the first version and the second version of the specific requirement artifact, and to compare performances of the test executions across the multiple environments using the data resulting from a first test execution of the first version and a second test execution of the second version; and
report the analyzed data.

2. The system of claim 1, wherein the one or more sources include a third party requirements service.

3. The system of claim 1, wherein the one or more sources include a custom requirements management service.

4. The system of claim 1, wherein the one or more sources include a spreadsheet template.

5. The system of claim 1, wherein the one or more sources include an XML document.

6. The system of claim 1, wherein the one or more processors are further configured to transform received requirements into requirements artifacts.

7. The system of claim 1, wherein the requirements artifacts are included in a versioned software release.

8. The system of claim 1, wherein the one or more processors are further configured to produce new versions of the software requirements artifacts, provided within a versioned release that contains the ability to compare and report upon the history of differences across previously released versions of the requirements service.

9. The system of claim 1, wherein the one or more processors are further configured to distribute address data representing real world addresses within supported countries using formats and languages supported by that country.

10. The system of claim 1, wherein the one or more processors are further configured to distribute customer data representing fictitious individuals within supported countries using formats and languages supported by that country with email addresses.

11. The system of claim 1, wherein the one or more processors are further configured to distribute tender data representing fictitious or real world information used for the payment of a financial obligation.

12. The system of claim 1, wherein the system comprises a data provider service that is distributed as a versioned software release.

13. The system of claim 1, wherein the tested software code includes small, standardized code references to implement specific test data.

14. The system of claim 1, wherein the one or more processors are further configured to access a third party data stimulation system.

15. The system of claim 1, wherein the one or more processors are further configured to manage hardware within an execution cluster.

16. The system of claim 1, wherein the one or more processors are further configured to distribute tasks to available resources.

17. The system of claim 1, wherein the one or more processors are further configured to record results of the test executions in an execution details data warehouse.

18. The system of claim 1, wherein the system comprises a configuration analysis subsystem.

19. The system of claim 1, wherein the system comprises an environment comparison subsystem.

20. The system of claim 1, wherein the system comprises a trend analysis subsystem.

* * * * *